United States Patent [19]

Schultz

[11] Patent Number: 5,588,071

[45] Date of Patent: Dec. 24, 1996

[54] IDENTIFYING AN AREA OF INTEREST USING HISTOGRAM DATA ARRANGED IN PREDETERMINED SEQUENCE

[75] Inventor: John C. Schultz, Afton, Minn.

[73] Assignee: Minnesota Mining and Manufacturing Company, St. Paul, Minn.

[21] Appl. No.: 329,493

[22] Filed: Oct. 26, 1994

[51] Int. Cl.⁶ ................................................. G06K 9/36
[52] U.S. Cl. ............................................. 382/168
[58] Field of Search .................................. 382/132, 168, 382/169, 171, 282, 291; 358/453, 538; 364/413.13

[56] References Cited

U.S. PATENT DOCUMENTS

| | | | |
|---|---|---|---|
| 4,176,275 | 11/1979 | Korn et al. | 250/213 R |
| 4,859,850 | 8/1989 | Funahashi et al. | 250/327.2 |
| 4,967,079 | 10/1990 | Shimura | 250/327.2 |
| 4,983,835 | 1/1991 | Takeo | 250/327.2 |
| 5,015,853 | 5/1991 | Nakajima | 250/327.2 |
| 5,179,597 | 1/1993 | Takeo | 382/41 |
| 5,268,569 | 12/1993 | Nelson et al. | 250/214 LA |
| 5,268,967 | 12/1993 | Jang et al. | 382/6 |
| 5,280,367 | 1/1994 | Zuniga | 358/462 |
| 5,343,390 | 8/1994 | Doi et al. | 364/413.16 |

FOREIGN PATENT DOCUMENTS

| | | | |
|---|---|---|---|
| 0383269 | 8/1990 | European Pat. Off. | G06F 15/68 |
| 0527524A1 | 2/1993 | European Pat. Off. | G06F 15/68 |
| 0653726 | 5/1995 | European Pat. Off. | G06T 5/40 |

OTHER PUBLICATIONS

Paranjape, Raman B. et al., "Adaptive-Neighbourhood Histogram Equiliazation for Image Enhancement", *Graphical Models and Image Processing*, vol. 53, No. 3, May 1992, pp. 259–267.

Stevens, R. J., Lehar, A. F., Preston, F. H., *IEEE Transactions on Pattern Analysis and Machine Intelligence*, PAM105, No. 5, pp. 520–526, Sep. 1983, "Manipulation and Presentation of Multidimensional Image Data Using the Peano Scan".

Mahmoodi, A. B., "Adaptive Image Interpolation Algorithum", *SPIE*, vol. 1898 *image processing*, 1993, pp. 311–319.

*Primary Examiner*—Andrew Johns
*Attorney, Agent, or Firm*—Carolyn A. Bates; Steven J. Shumaker

[57] ABSTRACT

A method for automatic analysis and enhancement of digitized images to identify the area of interest (AOI) from background areas divides a digitized image into a number of regions, and calculates histograms of gray scale or density for each region. An image of the regions in histogram space is created according to a selected sequence of the regions, chosen to preserve spatial proximity. This image is then processed by peak detection to identify features grouped spatially and by similarity of histograms. From this the AOI is identified, and the contrast enhancement is applied to the original image, according to the characteristics of the output device. The method is particularly adapted for enhancing medical X-ray images, for output to viewing devices.

23 Claims, 6 Drawing Sheets

16,588,071

IDENTIFYING AN AREA OF INTEREST USING HISTOGRAM DATA ARRANGED IN PREDETERMINED SEQUENCE

TECHNICAL FIELD

This invention pertains to the field of image processing techniques, and specifically to contrast analysis and enhancement of digital representations of pictures, through numeric and digital signal processing techniques.

BACKGROUND OF THE INVENTION

In the processing of images it is often necessary or desirable to provide corrections or enhancements to some characteristics of the image, by selectively modifying pixel data which represents the picture. Often it is desirable to alter the contrast of an area of interest (AOI) of the image in order to emphasize or reveal important information content therein. A number of different techniques and methodologies have been developed in the prior art for such image contrast manipulations. Some are based upon user selectable parameters, while others are automatic in their action, based upon various statistical assessments of the pixel data for an image. Digital image contrast enhancement techniques have been applied in a wide variety of fields, wherever pictures are represented by pixel data, including pictures obtained by non-visible as well as visible radiation.

In the field of radiography, for example, digital image handling systems are gaining acceptance as an alternative to, or a supplement to, conventional film-based X-ray systems. Once images have been acquired or converted to digital electronic form, they may be stored, retrieved, transmitted to remote locations, and viewed as needed on various types of output devices. Also, digital signal processing techniques may be used to enhance contrast or other properties of the image. Such images may be obtained through scanning and digitizing of conventional X-ray films. Alternatively, in digital radiography, imaging systems are provided which use photoconductive material to absorb incident radiation and form and hold a latent image of an object in the form of a distribution of charge carriers. Readout of the latent image and conversion of it to electronic form is achieved by scanning a narrow beam of radiation across the photoconductive material, and detecting the motion of charges caused thereby. Examples of this type of system are disclosed in U.S. Pat. No. 4,176,275 to Korn et al. and U.S. Pat. No. 5,268,569 to Nelson et al.

The dynamic range of images obtained through digital radiography or conventional X-ray film, i.e., the tonal range between the lightest and darkest parts of the image (Dmax and Dmin, for film) in which detail is recorded, generally exceeds the dynamic range of most output systems which might be used to view the image, such as CRT displays, film, and printers. This means that the contrast range of the image should be altered in some way in order to accommodate the output device. This may mean compressing the tonal range to fit the output medium. In other cases, it may be desirable to compress portions of the tonal range which do not contain information of interest, and expand the contrast range of the AOI to reveal the most significant information, depending upon the purpose of the image. For example, an X-ray image for viewing soft tissues would have a different contrast range of interest than one intended to look at bone structure.

In addition to matching the dynamic range of the output device, it is also important to place the tonal values of interest in a middle density range so that a trained human observer can easily see them. For example, it is easy for a human observer to see small density changes in the region of an optical density of 1.0 (medium dark), but it is very difficult to see small density changes in the region of an optical density of 3.0 (very dark), even though the detail is measurably present in both images.

Unlike X-ray film, in which only limited contrast control is available through adjustment of exposure and development parameters, a digitized image can be manipulated in a number of different ways to enhance contrast. It is possible to change the slope of the contrast curve in many ways, including different slopes in different ranges. Numeric tools are available to transform pixel values. The problem with digital image processing is not one of lacking tools with which to work on the image, but rather is one of trying to provide meaningful choices of image areas and contrast curves, out of the many possibilities.

Some systems have provided a number of user selectable modes or curves, to invoke predetermined contrast and constant algorithms. The idea would be to provide a number of programs to cover a number of commonly expected image situations, and allow the user to select. One problem with such a strategy is that the predetermined programs may not be the best for all cases. Another problem is that it requires additional steps of user time, and also possibly extra training for the user in order to know which mode is best or to interpret the results. When the same picture data set can produce a number of different-appearing displays on the same output device, depending on the selection of the mode, this can be confusing unless the user has been specifically trained in that system. This would lead to the possibility that important detail in the viewed image might be lost due to incorrect selection of the contrast mode. It is therefore desirable to have an automatic type system which can respond in some way to the data for a particular picture, to produce an optimum image, without user selection.

Also, depending upon the size of the data set for the picture and the available computation power, switching modes to compare can consume a considerable amount of time to compute and redisplay. This could be a particular problem in the case of remote systems, wherein the data transfer is slowed by communication links.

Various techniques have been proposed in the prior art for automatic picture analysis and contrast enhancement. Some examine the data array for the picture to find the low and high gray-level values and to find some predetermined scaling based on them. Others employ sophisticated statistical techniques based upon the picture dam set. A large number of these create a histogram of picture values, and then analyze it in various ways to make the contrast decision.

A histogram of the data values is a plot of the relative frequency of different image values, e.g., density values, of all the pixels in the set of pixels under consideration. Various prior art techniques then use various analyses or parameters extracted from the histogram in order to make decisions. Examples of techniques using histogram analysis are disclosed in U.S. Pat. No. 4,859,850 to Funahashi et al, U.S. Pat. No. 5,179,597 to Takeo, and U.S. Pat. No. 5,015,853 to Nakajima. One technique is to look for maxima and minima in the histogram curve. For example, in the case of a chest X-ray, there may be a high count of pixels at a very high density, corresponding to the "air" exposure of the relatively unimpeded X-rays directly to the film. There may be another relatively large count of low density pixels, corresponding to the mediastinum area. Finally, there may be another relatively large count over a broader range of intermediate to darker density areas which correspond to lung tissue. Such a histogram evidences a certain trimodal feature, and it may be possible to find the middle range value based upon this type of analysis. To the extent those techniques can successfully identify such features, they can provide a useful basis for contrast enhancement which covers a number of cases, but which falls short of optimum in many other cases.

A histogram of values is very useful in that it provides an abstraction of the content of the image, with a reduced data set, that makes computation easier, and provides a way to analyze things at a higher statistical level rather than at the pixel level. However, spatial information is lost in a histogram. In other words, the frequency of pixel gray level values is retained, but information about the spatial distribution of them is lost.

SUMMARY OF THE INVENTION

The present invention overcomes a major limitation of histogram based image analysis by retaining some spatial location information. For example, a good X-ray technician will place the portion of the body of interest to the physician somewhere near the center of the picture. We would therefore think that the information and pixel values generally in the center of the picture might be more significant than those, for example, that are completely along an edge, where they may be presumed to be not the center of the immediate medical need for the image. The trouble with conventional histogram techniques is that they completely ignore this spatial clue.

Therefore, there is proposed in the present invention a method which uses histograms in order to obtain statistically significant information on the tonal range or density values of the pixels, while at the same time makes use of a limited, but significant amount of spatial information, relating to location of values within the picture. In this manner, there is provided a system which can be fully automatic, and which applies its analysis to statistical histogram data, but in a manner which takes into account relative spatial orientation.

The present invention analyzes global and regional histograms to produce an estimate of the area of interest (AOI) pixel intensities to optimally enhance the image. This enhancement, coupled with appropriate output device transformations, will result in a high quality X-ray image output.

According to this invention, a digital image is broken up into a grid or number of regions across its area. Each region is statistically analyzed to form a histogram set of data on density therein. These histogram data are then sequenced in a pattern that relates to the original orientation and location on the original image. The resulting plots provide groupings of density values, in such a way that maxima and minima can be detected and related to centralized structures of the area or areas of interest. Once these tonal ranges of interest are identified, standardized contrast transformation techniques can be provided to place the values of interest on the dynamic range of the output device, in order to provide maximum information content to the viewer, of the area of interest.

In one embodiment, the spatial sequencing of histograms can proceed in a spiral type pattern, whereby edges are covered first, working inwardly toward the center of the image. Alternate sequences are also possible, in accordance with the present invention, including raster, sweep, and Peano-type sequence patterns. While the present invention will be explained in terms of image contrast enhancement as applied to the field of radiography, or medical X-rays, it will be appreciated that this is by way of example only, and the invention can be applied to image contrast enhancement for other types of images.

DETAILED DESCRIPTION OF THE INVENTION

Typical X-ray imagery contains up to three distinct regions. The main area of interest (AOI) is the object or body part of interest, for which the image was acquired. Another area is a background region with low dosage (Dmin on film) relative to the AOI where collimation or X-ray opaque materials were used to, for example, minimize exposure to X-ray radiation. The third area includes regions which have received a much higher dosage than the AOI (e.g. Dmax on film) such as regions where unobstructed X-ray radiation struck the imaging device through, e.g., air.

The importance of these three distinct regions, which may not all be present on any given X-ray image, is that useful clinical information is only contained in the AOI portion. Thus any enhancement of the pixel data to adequately display on CRT, paper, film, etc. output devices in consideration of display device limitations and the human visual response should ideally only take into account the AOI part of the image. Automatically separating the AOI region from the background regions which have variable size, location, and structure is a difficult task.

The present invention takes advantage of the empirical observation that most if not all background regions are at least partially abutting the edges of the image. Thus separately analyzing the histograms of the edges of the image and/or comparing these sequences to the histogram from the interior of the image will provide useful information about the background compared to the AOI.

Figures 1, 1A:
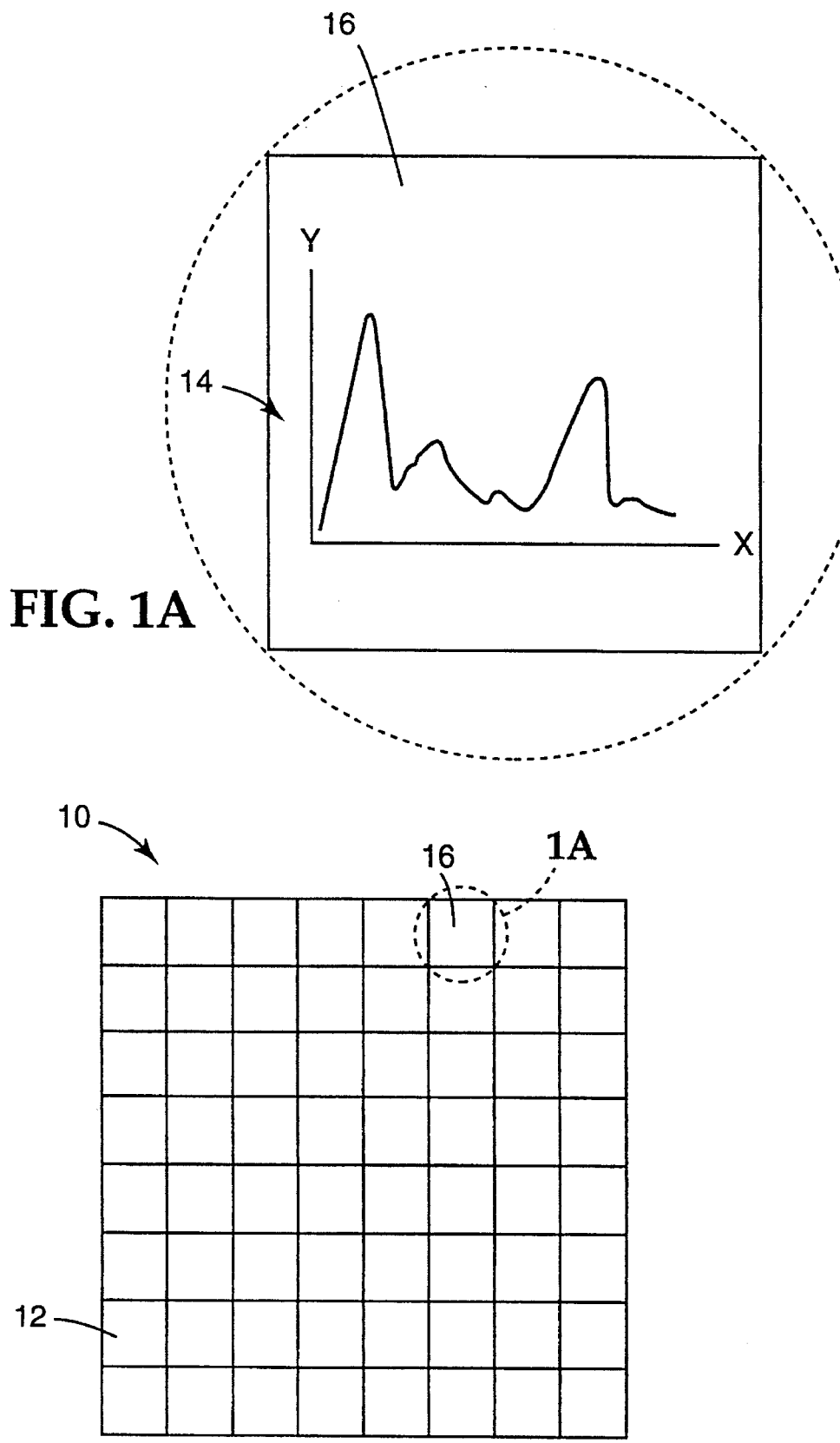
FIG. 1 is a diagrammatic representation of an image subdivided into regions, and an illustrative histogram from one of the regions.

In FIG. 1, reference number 10 indicates an image field for a picture which has been digitized for computer enhancement. The data array or matrix representing the picture would reside in a computer memory or storage file (not shown), and FIG. 1 represents the image space of the picture. As indicated by the grid of lines, the picture has been subdivided into a number of regions 12. The number and size of the regions can vary. The presently preferred method of the invention divides a 1024×1024 pixel input image into 256 64×64 pixel regions. This is done by using standard computational techniques on the image matrix to define the regions.

The histogram of each region is then calculated. Reference number 14 in FIG. 1 indicates a representation of a plot of a histogram for one of the regions 16 as an example. It is shown as a curve, where the x-axis represents image values, e.g., density values, and the y-axis represents relative frequency of occurrence of the image values in region 16. The shape of the curve will, of course, depend on the histogram data for the region.

The present invention then generates a histogram image of the many region histograms by making each histogram a row (or equivalently, a column) of the histogram image. This can be done by placing the histogram of each region into an image buffer to create an 'image' of the histogram. It should be noted that this image is not a pictorial image of anything in physical space, but rather is an image of the sequence of regions in histogram space. It may be viewed as an image if so desired, although that is not usually necessary, because it can be treated as an image within the computer, and analyzed using image processing techniques, as described herein, to yield useful information.

Figure 2:
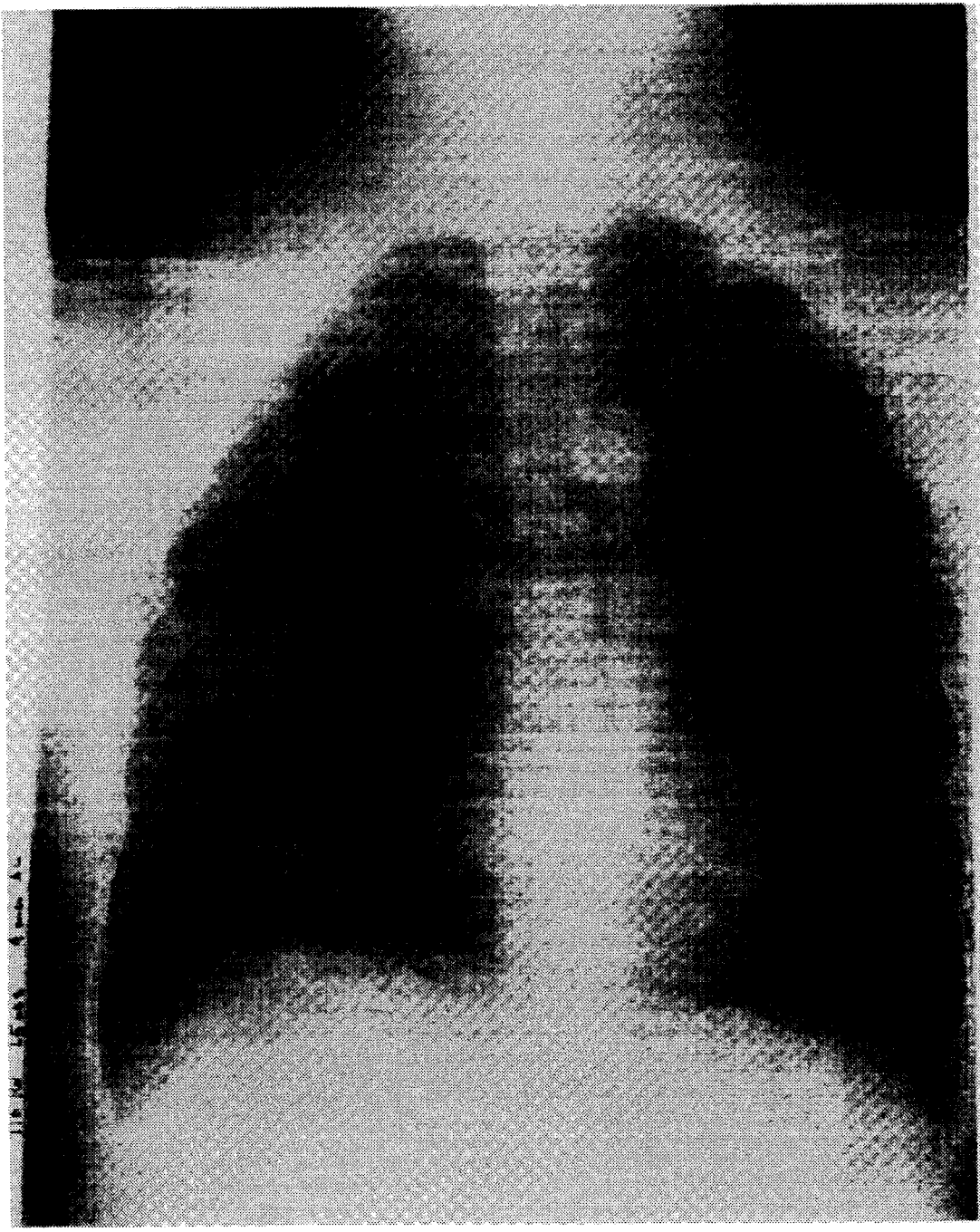
FIG. 2 is a chest X-ray, to which the invention may be applied.
Figure 3:
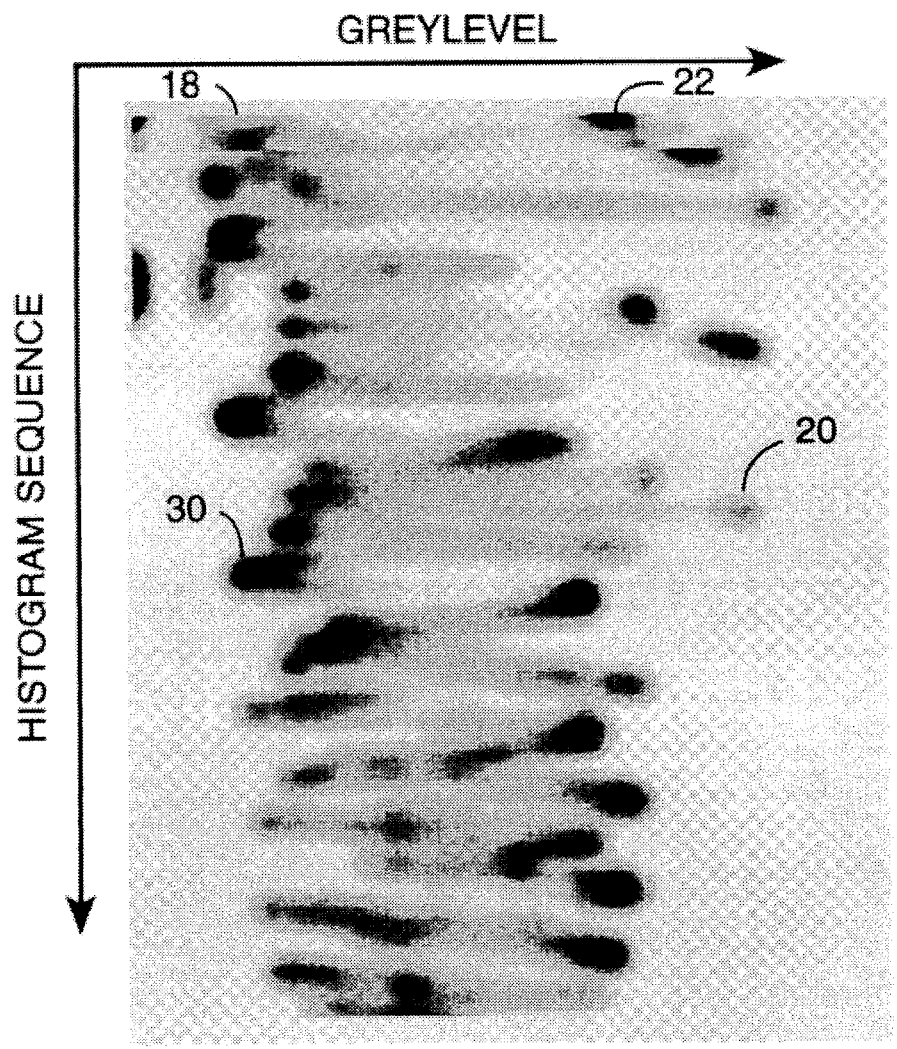
FIG. 3 is an image in histogram space resulting from applying the invention to the image of FIG. 2.

FIG. 2 is an example of a chest X-ray image obtained by conventional radiography. FIG. 3 is an example of an image generated in histogram space of the chest X-ray image of FIG. 2 by a method for spatial histogram analysis, in accordance with the present invention. The chest X-ray image is divided into a plurality of regions, as described above with respect to FIG. 1, and a separate histogram is generated for the image values, e.g., density values, existing in each region. Although the image space shown in FIG. 1 includes only 64 regions for purposes of illustration, the chest X-ray image of FIG. 2 actually was a 1024×1024 pixel image divided into 256 64×64 pixel regions to produce the histogram image of FIG. 3. The histograms for the regions are represented in FIG. 3 as a series of horizontal scan lines of the image, relative to the orientation of FIG. 3. The scan lines shown in FIG. 3 alternatively could be oriented vertically. A first horizontal scan line 18 in FIG. 3 represents histogram data pertinent to a first region of the chest X-ray image of FIG. 2. Similarly, another horizontal scan line 20 represents histogram data pertinent to another region of the chest X-ray image of FIG. 2.

The x-axis of the image in FIG. 3 represents the range of density or gray levels for the pixels in the chest X-ray image of FIG. 2, from light (Dmin on film) on the left, to dark (Dmax on film) on the right. The relative frequency of each value for a region histogram is represented in FIG. 3 as the darkness of the scan line. Thus, a dark portion of a particular scan line means a large number of pixels reside in the particular range of values aligned with the dark portion. In contrast, a light portion indicates a relatively low number of pixels residing in the particular range of values aligned with the light portion. It should be understood that the relative shade of a portion of a scan line does not in any way represent direct density in the chest X-ray image of FIG. 2. Rather, the relative shade of a portion of a scan line represents the number of pixels in a region that correspond to a density on the x-axis that is aligned with the respective portion. Thus, for example, a dark band 22 at the right-hand portion of scan line 18 in FIG. 3 indicates that the first region represented by the first scan line has a relatively large proportion of pixels in the darker gray levels.

The object of FIG. 3 is not for viewing, but for representation of the histogram space image stored in an image buffer within a computer where image processing techniques can be applied to isolate groups of similar region histograms. The histogram space image data enables the gray level range of the AOI to be determined, and contrast enhancement decisions to be made for outputting the original image.

However, before the gray level range of the AOI is determined, it is important to note the effect of different spatial ordering sequences for the regions on the patterns formed in the histogram space image, in terms of grouping of similar regions. The spatial information must be taken into account. The goal of the spatial ordering is to divide the digitized image into at least an edge region and an interior region. Histogram data is calculated for frequencies of image values within the edge region and the interior region, and the histogram data for the edge region and the interior region is stored to create a data set for an image in histogram space. FIGS. 4a, 4b, 4c and 4d are diagrams illustrating different exemplary sequences for plotting regions in histogram space to produce a histogram space image like that shown in FIG. 3. These region orderings can be referred to as raster (FIG. 4a), sweep (FIG. 4b), spiral (FIG. 4c), and Peano (FIG. 4d). For purposes of illustration only, the sub-divided images shown in FIGS. 4a–4d comprise only 64 regions.

Figure 4A:
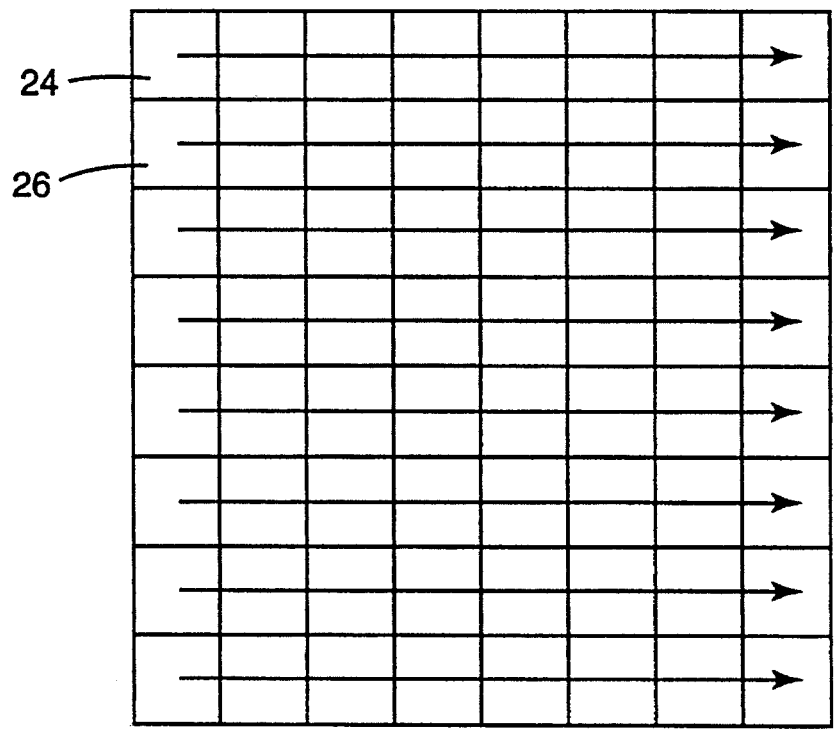
FIGS. 4a, 4b, 4c and 4d are diagrams illustrating different sequences for plotting regions in histogram space.

The raster order sequence shown in FIG. 4a of the region histograms is patterned after a standard method of scanning images. The first scan line of the histogram image consists of the histogram generated for a region 24 from the upper left corner of an image, such as the chest X-ray image shown in FIG. 2. The second scan line is based on the histogram generated for the next horizontally-aligned region to the right of region 24, and is followed sequentially by the scan lines based on histograms generated for the remaining horizontally-aligned regions in the top row until the top row of regions is exhausted. After completion of the top row, the next scan line consists of the histogram generated for a region 26 down one row and to the far left. The sequence is carried out in raster manner as indicated in FIG. 4a until all of the regions have been covered. The raster sequence does not preserve spatial relationships between adjacent regions either vertically or at the end of the rows, but is useful in preserving spatial relationships between regions in the same row.

Figure 4B:
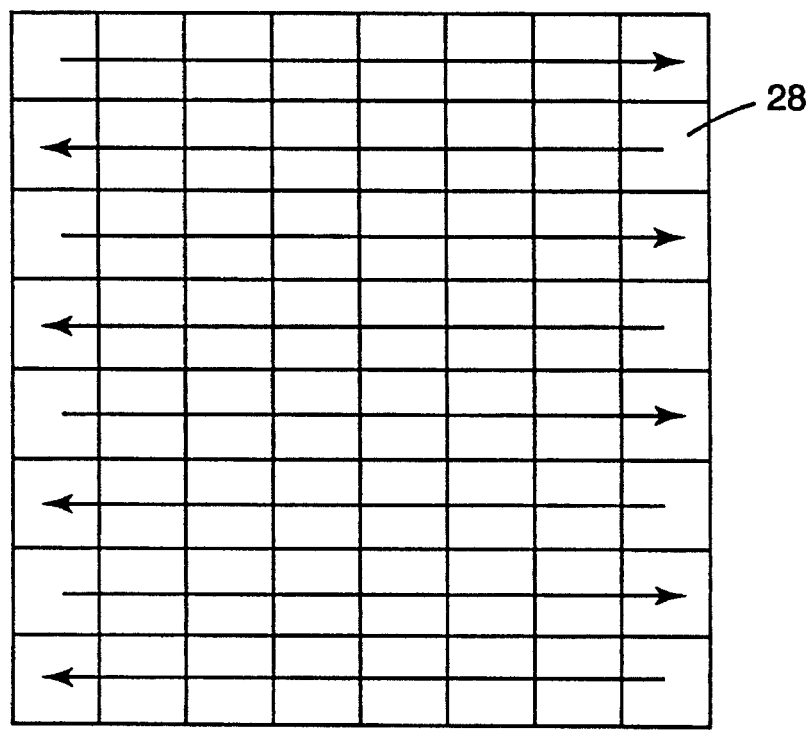

The sweep sequence of FIG. 4b operates in a manner similar to the raster sequence, in that the sweep sequence sequentially orders regions horizontally-aligned in the same row. However, the sweep sequence begins ordering the next row at the region 28 immediately below the end of the previous sequencing row, thereby preserving the spatial relationship at the end of the rows of regions. Although the sweep sequence retains this spatial relationship at the end of rows, it does not retain vertical spatial information in general.

Figure 4C:
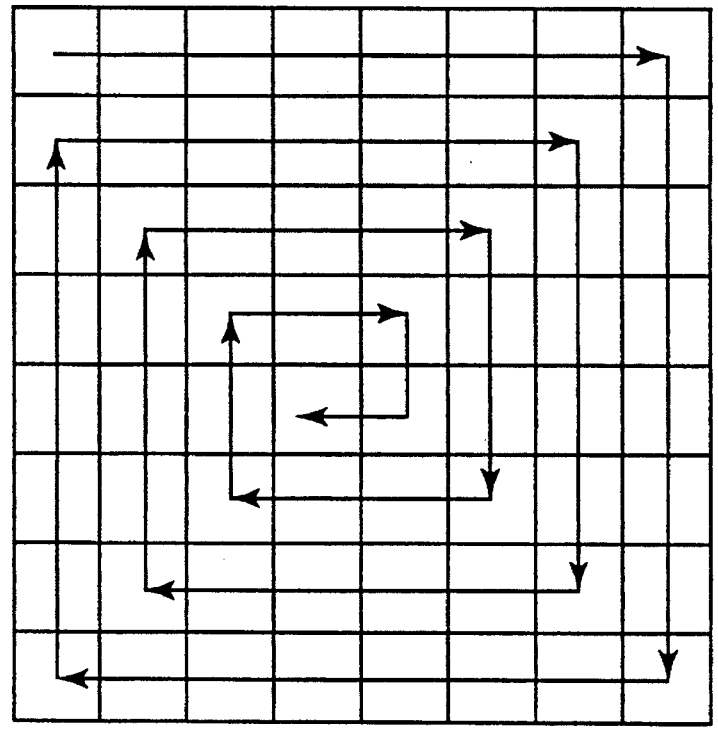
Figure 4D:
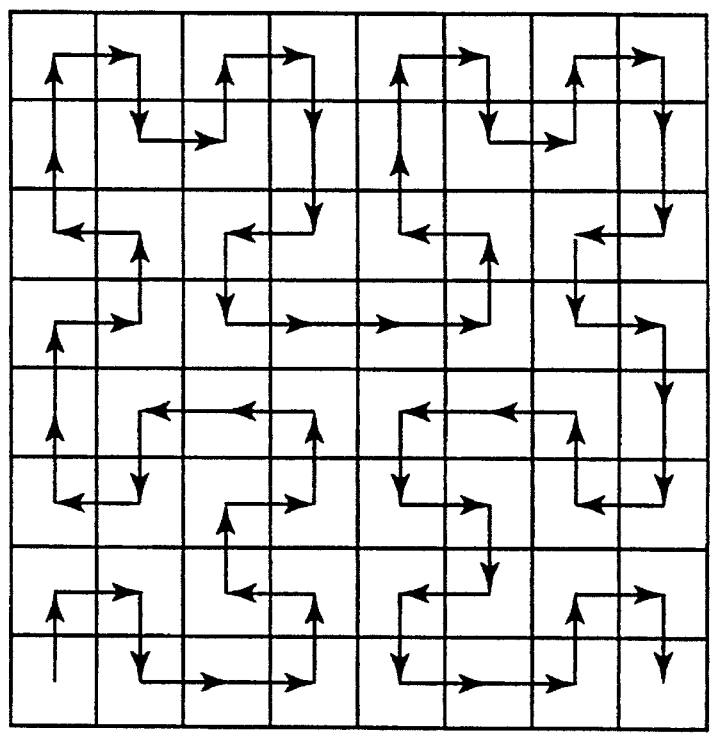

The spiral sequence of FIG. 4c orders all the defined regions of the original image in a spiral pattern. This spiral sequence retains about the same amount of local spatial information as the sweep sequence. However, the regions near the image boundaries are grouped, as are the next succeeding "onion-peel" layers inward, toward the center. Therefore, this technique of ordering the region histograms into the histogram image will preserve a central focus of the image, i.e. the edge regions of the image will be more readily separated from the interior portions. Note also that the spiral can be either clockwise or counterclockwise, and can either start from the edge and spiral in, or start from the center and spiral outward. In each case, the resulting histogram space image will be different, but the grouping of local neighborhood information and separation of edge and center areas will be preserved. The histogram space image of FIG. 3 was created using the spiral sequence illustrated by FIG. 4e.

The last sequence method, Peano, shown in FIG. 4d, is an adaptation of a version of a space filling curve also called a Hilbert or a class of fractal curves. A discussion of the application of a Peano scan to general image data can be found, for example, in "Manipulation and Presentation of Multidimensional Image Data Using the Peano Scan," R. J. Stevens, A. F. Lehar, and F. H. Preston, in IEEE Transactions on Pattern Analysis and Machine Intelligence, Vol. PAMI-5, No. 5, pages 520–526, September, 1983. The Peano sequence method of the present invention preserves much more neighborhood information than other techniques, but does not retain as much image interior/edge information as the spiral sequence technique. As shown in FIG. 4d, the Peano method orders the regions by a pattern that extends throughout the image while touching each region once and only once.

The ideal histogram space image would have the histograms for all of the background regions (the edge portions of the chest X-ray image shown in FIG. 2) grouped together, and the histograms for all of the AOI regions (the interior portions of the chest X-ray image shown in FIG. 2) grouped together. Such an arrangement would enable the gray level range of the AOI to be resolved more readily from the background. Although each of these sequences can provide useful information, the spiral sequence and the Peano sequence methods produce particularly good grouping of background and AOI regions. The spiral sequence approach, in particular, retains both the local spatial neighborhood information and groups the data from the edges and from the center of the image.

After sequencing the histograms generated for each region to assemble a histogram space image, in accordance with the present invention, the resulting image can be analyzed using image processing techniques to isolate the AOI regions from the background regions. For example, low pass filtering can be applied to the histogram space image data to discard more transient data, with the more continuous data indicative of regional gray level trends, i.e., background versus AOI gray levels, being retained. The filtered data can then be subjected to any of a variety of segmentation techniques for identifying the gray levels of the AOI from the histogram space image of the histograms. Suitable segmentation techniques may include, for example, basic peak detection, Gaussian kernal correlation, K-means clustering, medial axis calculation, or calculation of moments. An example of a commercially available software package providing a wide range of suitable segmentation techniques is the Khoros package, available from Khoral Research, of Albuquerque, New Mexico.

The peak regions in histogram space can be noted from an examination of the histogram space image shown in FIG. 3. The first number of scan lines starting with scan line 18 at the top of the image shown in FIG. 3 represent edge regions, as is the case when the spiral sequence is applied. The large dark region 22 at the right edge of scan line 18 will be peak detected by comparison to a first threshold, and will be recognized as an indication of a large number of pixels in a relatively high gray level range, and thus an indication of the gray level range of background exposure. A large peak area 30 toward the center of FIG. 3 will be peak detected by comparison to a second threshold, and recognized as an indication of a large number of pixels at a low gray level range, and thus an indication of the gray level range for the mediastinum in the chest X-ray image of FIG. 2. Not as visible in FIG. 3, but detectable by peak detection image processing, will be two mid-gray level, broader peaks representing the lungs. They will be detectable because they will be in regions having similar histograms, and they will be spatially adjacent in the histogram space image because the spiral and Peano sequences preserve such spatial information.

The rules applied to identify particular regions of the radiographic image based on the histogram image of FIG. 3 can be determined by heuristic techniques. Such techniques can be based, for example, on the portion of the anatomy being imaged, the selected sequence method, e.g., raster, sweep, spiral, Peano, and the portion of the histogram image under consideration. Thus, the rules are highly empirical and subject to variation according to the circumstances. A purely exemplary set of rules, implemented in pseudo-code, is provided below for the case of a spiral-sequence histogram image generated for a radiographic image representing a chest X-ray:

```
// assumptions:
//   1.  radiographic image represents chest X-ray;
//   2.  spiral sequence selected;
//   3.  top of spiral sequence corresponds to edges of histogram
//       image
//   4.  each histogram in histogram image based on an m × m
//       pixel region of radiographic image;
//   5.  image size is n × n pixels; and
//   6.  contrast enhancement of lung field desired, i.e., lung
//       field is AOI.
if (chest)
    if (spiral)
        if (top of histogram image)
            if (any peaks in top 4*n/m of histogram image)
                if (greater or less than lower peaks)
                    these gray levels are background
                else
                    may be large chest
                    goto large chest processing ·
        else if (bottom ½ of histogram image)
            if (many peaks in roughly the same vertical column
                of histogram image)
                low gray level (left) peaks are
                    mediastinum
                high gray level peaks are lung field
            therefore: use 60% of dynamic range of output device for
            gray levels in the lung field
```

The above pseudo-code represents the analysis of a histogram space image, as in FIG. 3, by determining the type of original radiographic image (chest), the type of sequence applied in accordance with the present invention (spiral), the area of the histogram image under consideration (top versus bottom is most significant for the spiral sequence), and whether gray level values in the area exceed certain peaks. Areas of interest in the radiographic image are then identified based on the existence of peaks in areas of the histogram image. To clarify, each of the scan lines in the histogram image represents the histogram data for a single sequence region of the original radiographic image. If a peak is identified with respect to a series of scan lines in the histogram image, the gray level range corresponding to the peak in the histogram image can be interpreted as the gray level range existing in the corresponding regions of the original radiographic image. Once the area of interest is identified by the heuristic peak detection analysis described above, the dynamic range of the output device can be adjusted to enhance contrast in the radiographic image for those areas.

Note that in the case of a single histogram, or a plurality of histograms without a spatial sequence in accordance with the present invention, it would be difficult to identify the gray scale values of the mediastinum or lungs. Bones of the ribs and shoulders would have some gray levels as well as the mediastinum, and it would be difficult to tell them apart. Also, the technique of always looking to the center of the original image is not workable, because of differences in size of individuals, and positioning of them on the film. However, a spatial histogram analysis method in accordance with the present invention will lead to the identification of the regions for the AOI despite those variables.

Once the gray level range for the AOI has been identified by image processing, the actual density values of the AOI can be read, and the automatic adjustment for optimum contrast range can be made according to the characteristics of the output device.

Figure 5:
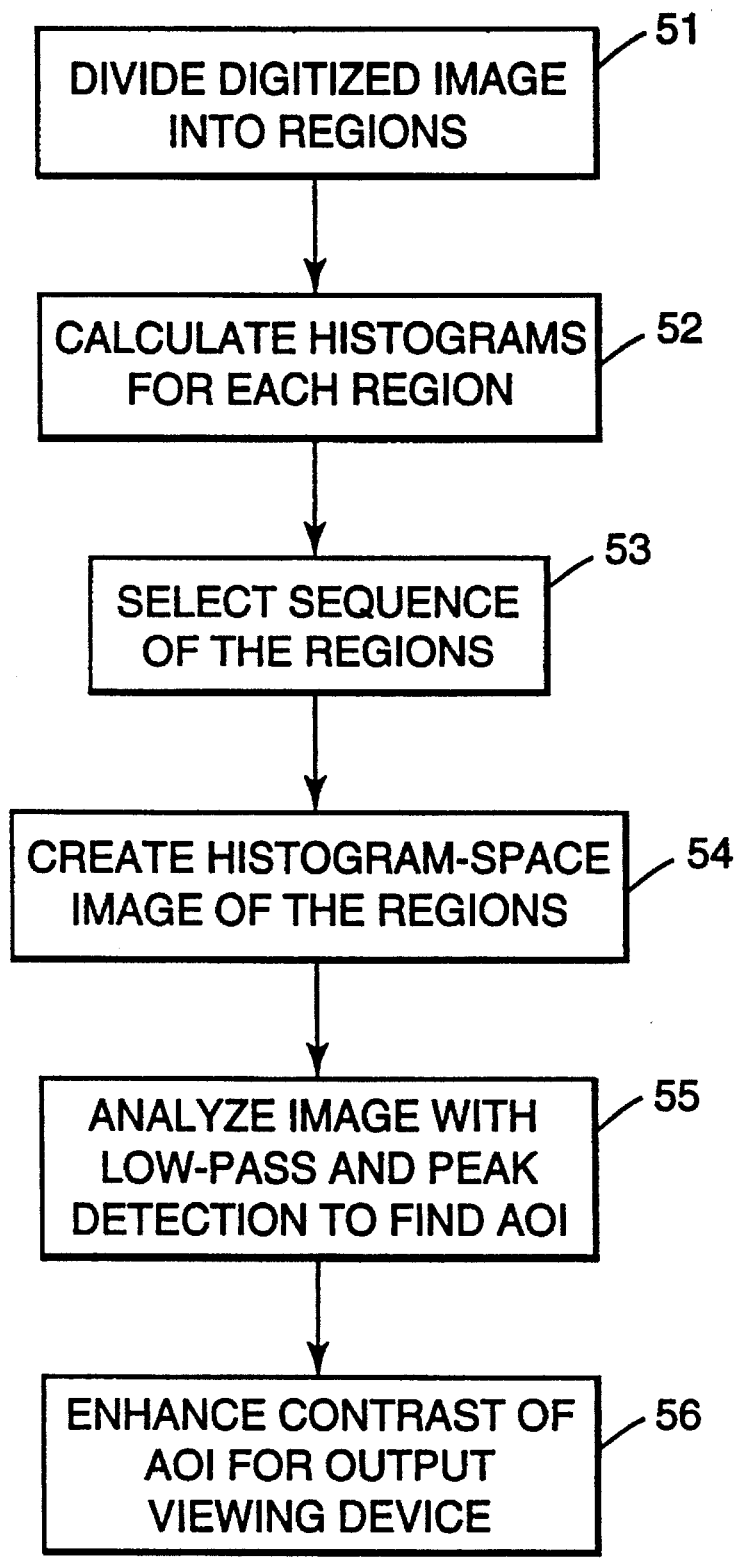
FIG. 5 is a flow chart illustrating the steps of the invention.

The steps of the invention are summarized in the flow chart of FIG. 5. First a digitized image is divided into a number of regions, as indicated by block 51. If the original image is not in digital form, it would first be scanned and digitized. Histograms of gray scale or density are then compiled for each region, as indicated by block 52. A sequence is then selected, as indicated by block 53, and an image of the regions in histogram space is created, as indicated by block 54. This image is then processed by low pass filtering and peak detection, or other segmentation techniques, to identify features grouped spatially and by similarity of histograms, as indicated by block 55. From this grouping, the gray level range corresponding to the AOI is identified, and the contrast range and contrast function of the output viewing device is enhanced, possibly with anatomy specific enhancement functions, to better represent the AOI, as indicated by block 56. The contrast enhancement for the AOI is then applied to the original digitized image, according to the characteristics of the output device.

Having described the exemplary embodiments of the invention, additional advantages and modifications will readily occur to those skilled in the art from consideration of the specification and practice of the invention disclosed herein. Therefore, the specification and examples should be considered exemplary only, with the true scope and spirit of the invention being indicated by the following claims.

What is claimed is:

1. A method of analyzing a data set of a digitized image to identify an area of interest, the method comprising the steps of:

dividing the digitized image into a plurality of regions;

calculating histogram data for frequencies of image values within each of the plurality of regions;

organizing the histogram data for each of the regions according to a predetermined sequence of the plurality of regions to create a data set for an image in histogram space of the plurality of regions; and analyzing said data set for the image in histogram space of the plurality of regions to identify localities of maxima and minima in grouped image value characteristics which correspond to the area of interest within the digitized image.

2. The method of claim 1, wherein said predetermined sequence comprises a spiral sequence of the plurality of regions around the digitized image.

3. The method of claim 1, wherein said predetermined sequence comprises a Peano sequence of the plurality of regions around the digitized image.

4. The method of claim 1, wherein said predetermined sequence comprises a raster sequence of the plurality of regions around the digitized image.

5. The method of claim 1, wherein said predetermined sequence comprises a sweep sequence of the plurality of regions around the digitized image.

6. The method of claim 1, wherein said digitized image represents an image obtained by radiography.

7. A method of analyzing a data set of a digitized image to identify an area of interest, the method comprising the steps of:

dividing the digitized image into an array of regions;

calculating histogram data for frequencies of density values within each of the regions;

establishing an ordered sequence of the regions;

organizing the histogram data for each of the regions according to the ordered sequence to create a data set for an image in histogram space of the regions; and analyzing said histogram space image data set to identify localities of maxima and minima in grouped density values which correspond to the area of interest within the digitized image.

8. The method of claim 7, wherein the step of establishing said ordered sequence comprises establishing a spiral sequence of the regions around the digitized image.

9. The method of claim 7, wherein the step of establishing said ordered sequence comprises establishing a Peano sequence of the regions around the digitized image.

10. The method of claim 7, wherein the step of establishing said ordered sequence comprises establishing a raster sequence of the regions around the digitized image.

11. The method of claim 7, wherein the step of establishing said ordered sequence comprises establishing a sweep sequence of the regions around the digitized image.

12. The method of claim 7, wherein said digitized image represents an image obtained by radiography.

13. A method of enhancing image contrast of an area of interest in a digitized image represented by a set of pixel data, comprising:

dividing the digitized image into an array of regions;

calculating histogram data for frequencies of density values for pixels within each of the regions;

establishing an ordered sequence of the regions;

ordering the histogram data according to said ordered sequence of the regions to create a set of data representing an image of the regions in histogram space;

analyzing said set of data representing the image of the regions in histogram space to identify localities of peaks in density values which correspond to an area of interest within the digitized image; and applying a contrast enhancement function to create a new set of pixel data, the contrast enhancement function changing density values of the pixel data in the area of interest to create the new set of pixel data.

14. The method of claim 13, wherein the step of establishing said ordered sequence comprises establishing a spiral sequence of the regions around the digitized image.

15. The method of claim 13, wherein the step of establishing said ordered sequence comprises establishing a Peano sequence of the regions around the digitized image.

16. The method claim 13 wherein the digitized image is a radiography image, and wherein the identified localities of the peaks correspond to physiological structures in the radiography image.

17. The method of claim 13 wherein the contrast enhancement function adjusts contrast of the area of interest to match characteristics of an output viewing device.

18. A method of identifying an area of interest in a digitized image, the method comprising the steps of:

dividing the digitized image into a plurality of regions;

calculating histogram data for frequencies of image values within each of the plurality of regions;

storing the histogram data for each of the regions according to a predetermined spatial sequence of the plurality of regions to create a data set for an image in histogram space of the plurality of regions, said predetermined spatial sequence substantially separating histogram data for the plurality of regions at an edge portion of said digitized image from histogram data for the plurality of regions at an interior portion of said digitized image; and identifying localities of maxima and minima of said image values in said data set to determine the area of interest within the digitized image.

19. The method of claim 18, wherein the predetermined spatial sequence comprises a spiral sequence of the plurality of regions around the digitized image.

20. The method of claim 18, wherein the ordered sequence comprises establishing a Peano sequence of the plurality of regions around the digitized image.

21. The method of claim 18, wherein the predetermined spatial sequence comprises a raster sequence of the plurality of regions around the digitized image.

22. The method of claim 18, wherein the predetermined spatial sequence comprises a sweep sequence of the plurality of regions around the digitized image.

23. The method of claim 18, wherein said digitized image represents an image obtained by radiography.

* * * * *